United States Patent [19]

Tsutsui et al.

[11] Patent Number: 5,276,667
[45] Date of Patent: Jan. 4, 1994

[54] OPTICAL RECORDING AND REPRODUCING APPARATUS FOR SYNCHRONIZING RECORDING ON SUBSEQUENT UNRECORDED SECTORS

[75] Inventors: Keiichi Tsutsui, Nagaokakyo; Shigeru Yoda, Osaka; Kouji Sogou, Takatsuki, all of Japan

[73] Assignee: Omron Corporation, Kyoto, Japan

[21] Appl. No.: 944,740

[22] Filed: Sep. 14, 1992

Related U.S. Application Data

[63] Continuation of Ser. No. 481,329, Feb. 20, 1990, abandoned.

[30] Foreign Application Priority Data

Feb. 22, 1989 [JP] Japan ................... 1-42868
Feb. 23, 1989 [JP] Japan ................... 1-44022

[51] Int. Cl.$^5$ ................... H04N 5/76; G11B 5/09
[52] U.S. Cl. ................... 369/59; 369/48
[58] Field of Search ................... 369/59, 48, 49, 54, 369/60

[56] References Cited

U.S. PATENT DOCUMENTS

| | | | |
|---|---|---|---|
| 4,594,701 | 6/1986 | Earman et al. | 369/59 |
| 4,674,071 | 6/1987 | Okumura et al. | 369/48 |
| 4,862,443 | 8/1989 | Tsuji et al. | 369/59 |
| 5,051,569 | 9/1991 | Tsuruoka et al. | 235/494 |

FOREIGN PATENT DOCUMENTS

| | | |
|---|---|---|
| 0098349 | 1/1984 | European Pat. Off. |
| 0276326 | 8/1988 | European Pat. Off. |
| 62-018676 | 1/1987 | Japan |
| 61-188743 | 1/1987 | Japan |
| 62-139179 | 6/1987 | Japan |
| 63-052393 | 3/1988 | Japan |
| 63-113873 | 5/1988 | Japan |
| 63-131330 | 6/1988 | Japan |

*Primary Examiner*—Donald Hajec
*Assistant Examiner*—Won Tae C. Kim
*Attorney, Agent, or Firm*—Dickstein, Shapiro & Morin

[57] ABSTRACT

Disclosed is an optical recording and reproducing apparatus capable of recording in a position which is properly synchronous with the position of the last pit in a sector on which a recording was made, the first pit in a sector on which a recording is to be subsequently made. This apparatus is characterized by a recording circuit having a data demodulating circuit which includes a synchronizing signal separating circuit. The synchronizing signal separating circuit outputs a synchronizing signal on the basis of a pit detection signal generated in response to the detection of pits formed on a track of a recording medium and representing data to be recorded. An end pattern detecting circuit is employed for outputting an end pattern detection signal when an end pattern of a sector is detected in a data signal outputted from the data demodulating circuit an initial pulse leading edge timing generating circuit is also included which consist of a counter responsive to the signal of the data demodulating circuit for starting the counting of high-frequency clock pulses, an initial pulse time setting circuit in which the time for defining the leading edge of an initial pulse is set, and a comparing circuit (73) for outputting the initial pulse when a count number in the counter coincides with the time set in the initial pulse time setting circuit.

4 Claims, 11 Drawing Sheets

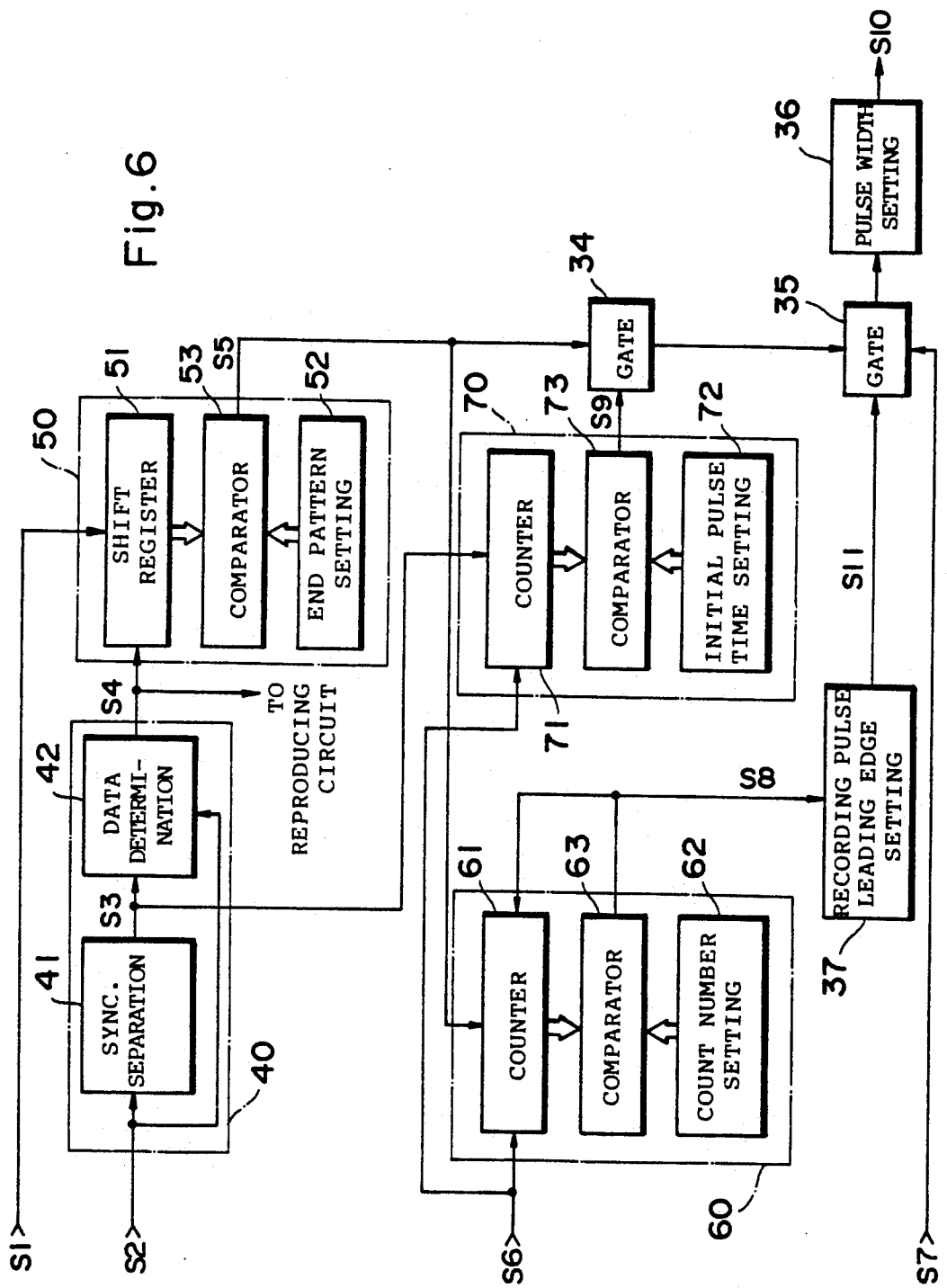

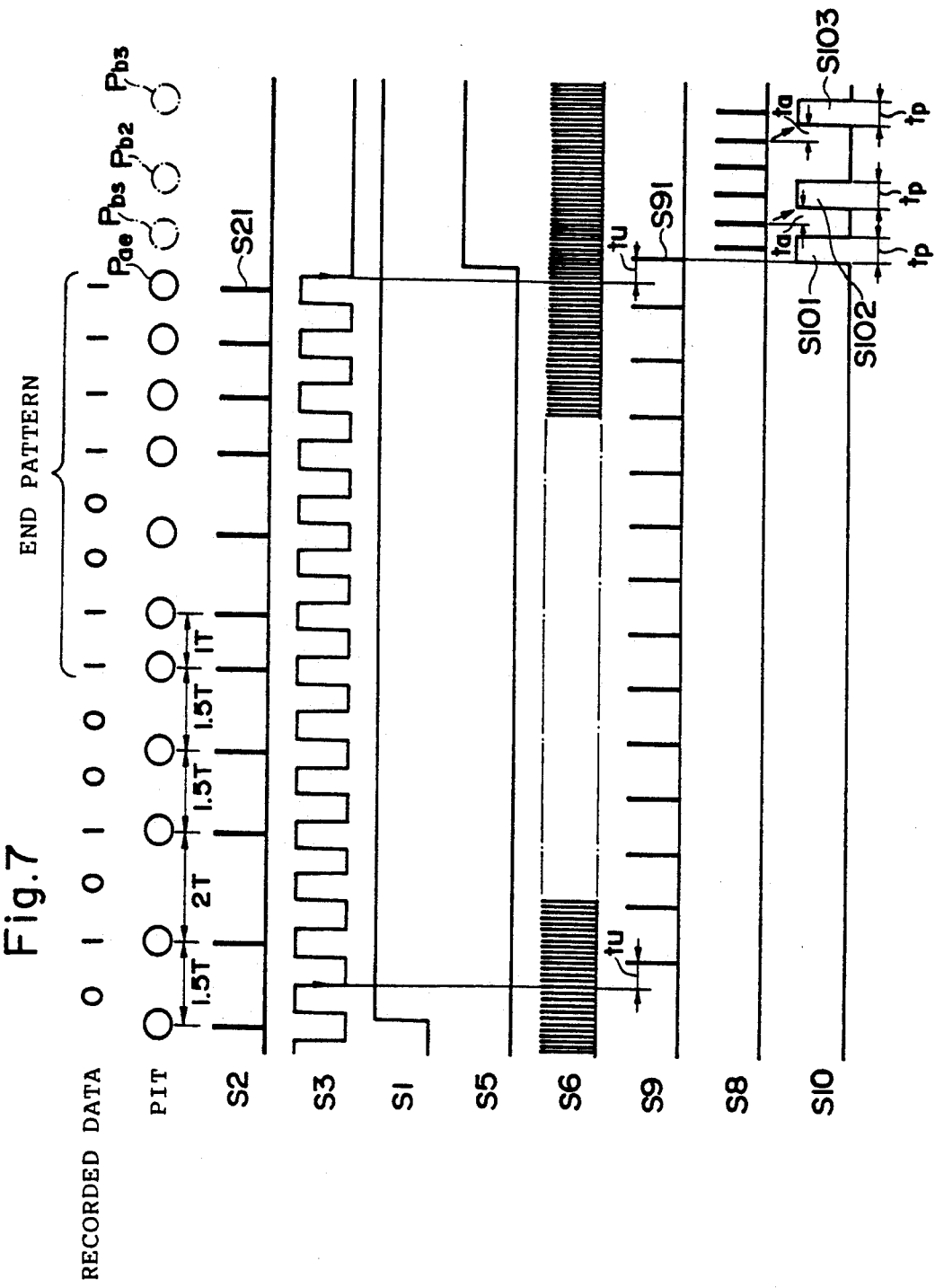

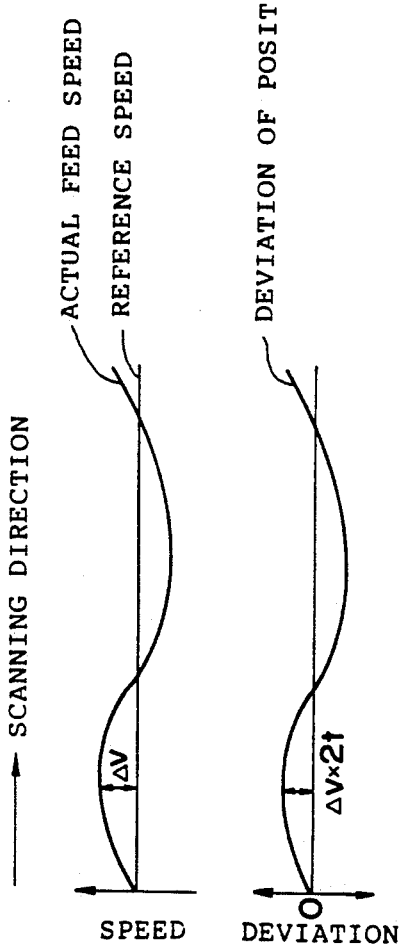
Fig.8a
Fig.8b
Fig.8c
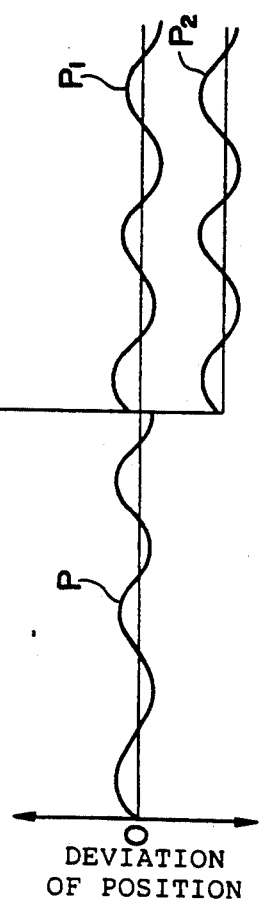
Fig.9

OPTICAL RECORDING AND REPRODUCING APPARATUS FOR SYNCHRONIZING RECORDING ON SUBSEQUENT UNRECORDED SECTORS

This application is a continuation of application Ser. No. 07/481,329 filed Feb. 20, 1990, now abandoned.

BACKGROUND OF THE INVENTION

1. Field of the Invention

The present invention relates generally to an optical recording (writing) and reproducing (reading or playing back) apparatus for forming pits on an optical recording medium depending on given data to be recorded using a light spot projected from a recording light projection optical system. The present invention includes a semiconductor laser to record the data on the optical recording medium. The optical recording medium is illuminated using a light spot projected from a reproducing light projection optical system. The reflected light from the optical recording medium is converted into an electrical signal through a reproducing light reception optical system including a light receiving element to read data represented by the pits. More particularly the present invention involves a recording and reproducing apparatus for a WORM storage medium (write once, read many) forming new pits to record additional data in an unrecorded region subsequent to the recorded pits on the optical recording medium.

2. Description of the Prior Art

The format shown in FIG. 1a represents a known format (continuous WORM type format) for recording data in pit form on a track of a card-shaped optical recording medium used in this type of optical recording and reproducing apparatus.

In the continuous WORM type format shown in FIG. 1a, one track of an optical recording medium includes a plurality of sectors A, B, C and D. The sectors A to D are contiguous to each other. The sectors A to D respectively comprise data portions $a_1$ to $d_1$ in which data are recorded and sector information portions $a_2$ to $d_2$ in which information regarding the sectors are recorded. A lead portion $e_2$ is the track information portion. In the continuous WORM type format, no space indicating the boundary between the contiguous sectors exists between the sectors. For example, as shown in FIG. 1b, the first pit $P_{bs}$ out of pits $P_b$ in the succeeding sector B is additionally recorded (additionally formed) subsequently to the last pit $P_{ae}$ out of pits $P_a$ recorded (formed) in the preceding sector A.

In order to properly establish synchronization in continuously reproducing the pits in the sectors A and B, when data is additionally recorded in the sector B subsequently to the sector A, the first pit $P_{bs}$ in the sector B must be recorded in a position which is synchronous with the position of the last pit $P_{ae}$ in the sector A. The sector information portion $a_2$ exists in the rear end of the sector A, as described above. Pits indicating a mark or pattern representing the end of the sector (referred to as sector end pattern hereinafter) are formed in this sector information portion $a_2$. The recording and reproducing apparatus must comprise a means for properly reading such a sector end pattern and forming the first pit $P_{bs}$ to be recorded in the sector B in a position which is properly synchronous with the position of the last pit $P_{ae}$ in the sector A.

SUMMARY OF THE INVENTION

An object of the present invention therefore is to provide an optical recording and reproducing apparatus comprising a recording circuit capable of recording, in a position which is properly synchronous with the position of the last pit in a sector on which recording was made, the first pit in a sector on which recording is to be subsequently made.

Another object of the present invention is to make it possible to properly record, even if it is impossible to detect the last pit in a sector on which recording was made due to defects such as flaws on a track of a recording medium, the first pit in a sector on which recording is to be subsequently made.

A further object of the present invention is to make it possible to record a pit to be recorded subsequently to a pit already recorded in a recording medium such that the amount of the shift in position of the pit to be recorded is not rapidly changed relative to the amount of the shift in position of the recorded pit.

An optical recording and reproducing apparatus according to the present invention is characterized by recording circuit which comprises data demodulating means comprising a synchronizing signal separating circuit for outputting a synchronizing signal on the basis of a pit detection signal generated in response to the detection of pits formed on a track of a recording medium and representing data to be recorded; an end pattern detecting means for outputting an end pattern detection signal when an end pattern of a sector is detected in a data signal outputted from the above data demodulating means; an initial pulse leading edge timing generating means comprising a counter means responsive to the signal of the above data demodulating means for starting counting of high-frequency clock pulses; an initial pulse time setting means in which the time for defining the leading edge of an initial pulse is set, and a comparing means for outputting the initial pulse when a count number in the above counter means coincides with the above time set in the initial pulse time setting means.

In the above described construction, the synchronizing signal which is synchronized with the pit detection signal is separated and outputted from the synchronizing signal separating circuit in the data demodulating means. On the other hand, the end pattern detection signal is outputted when the end pattern of the sector is detected in the data signal from the data demodulating means.

The counter means in the initial pulse leading edge timing generating means starts counting high-frequency clock pulses in response to the signal of the data demodulating means. When the count number in the counter means corresponds to the time for defining the leading edge of the initial pulse set in the initial pulse time setting means, the initial pulse is outputted from the comparing means. When the end pattern detection signal is outputted from the end pattern detecting means, recording pulses are outputted in response to the initial pulse from the initial pulse leading edge timing generating means.

In the above described manner, it becomes possible to properly record, in a position spaced apart from the position of the last pit constituting the end pattern recorded in the rear portion of the sector on which recording was made by a distance corresponding to the above time for defining the leading edge of the initial pulse, the first pit in the next sector.

Preferably, the above described synchronizing signal separating circuit is constituted by a PLL (Phase-Locked Loop), and the synchronizing signal outputted from the above synchronizing signal separating circuit is used as a signal for starting a counting operation of the above counter means.

Even if the last pit in the end pattern is not detected due to flaws and defects on the track of the recording medium and thus, the pit detection signal is not applied to the data demodulating means, the synchronizing signal outputted from the synchronizing signal separating circuit in the data demodulating means is continuously generated in the cycle of the previous synchronizing signal when a region where there are flaws and defects on the track corresponds to approximately one to two or few pits. Accordingly, the initial pulse can be outputted from the initial pulse leading edge timing generating means in response to the synchronizing signal. Consequently, the first pit in the next sector can be additionally recorded in a position which is properly synchronous with the position of the last pit in the end pattern of the sector on which the recording was made on the basis of the initial pulse.

An optical recording and reproducing apparatus according to the present invention is characterized by comprising a recording circuit which comprises data demodulating means for generating a synchronizing signal on the basis of a pit detection signal generated in response to the detection of pits formed on a track of a recording medium representing data to be recorded; time width generating means for outputting a time width signal corresponding to the time width associated with the period of the synchronizing signal applied from the above data demodulating means; and a recording timing signal generating means for generating and outputting recording timing signals at constant time intervals on the basis of the time width signal applied from the above time width generating means.

In the above described construction, the data demodulating means generates the synchronizing signal in synchronization with the pit detection signal generated in response to the detection of the recorded pit. The time width generating means outputs the time width signal associated with the cycle of the synchronizing signal applied from the data demodulating means. The recording timing signal generating means generates and outputs the recording timing signals after a time delay corresponding to the time width signal applied from the time width generating means from the time point where the last recorded pit was detected.

The recorded pit has been recorded in the recording medium with the position thereof being shifted from the regular position where the pit is to be recorded due to the feed speed fluctuation of the recording medium in the case where the recorded pit had been recorded. On the other hand, even if the feed speed fluctuation of the recording medium in the case where a pit to be additionally recorded is recorded differs in phase from the feed speed fluctuation of the recording medium in a case where the recorded pit had been recorded, the cycle of the synchronizing signal corresponds to the feed speed fluctuation in a case where the recorded pit had been recorded. Accordingly, the next pit can be additionally recorded in response to the recording timing signals generated at timing corresponding to the time width signal having the time width associated with the cycle of the synchronizing signal. Consequently, the pit to be additionally recorded will be recorded on the recording medium such that the amounts of the shift in position of the pit to be recorded and the recorded pit are continuous. Therefore, both the pits can be accurately reproduced at the time of reproduction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a block diagram showing an internal circuit in an optical recording and reproducing apparatus in a modified example;

FIG. 7 is a timing chart for explaining an operation of the optical recording and reproducing apparatus shown in FIG. 6;

FIGS. 8a, 8b and 8c are diagrams respectively showing a sector, a state where the feed speed of a recording medium in the sector fluctuates, and a state where the position of a pit is shifted due to the fluctuation in feed speed;

FIG. 9 is a diagram showing a state where the amounts of the shift in position of pits are rapidly changed in the boundary between two sectors;

DESCRIPTION OF THE PREFERRED EMBODIMENTS

Figure 1A:
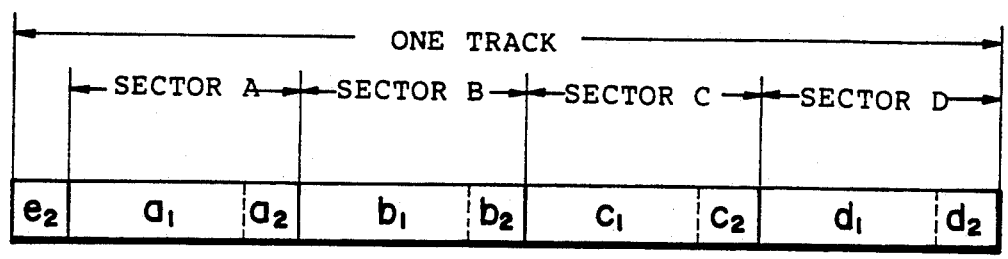
FIGS. 1a and 1b are diagrams showing a format of a continuous WORM type storage medium.
Figure 1B:
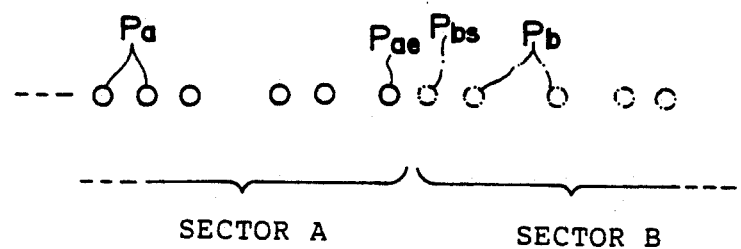
Figure 2:
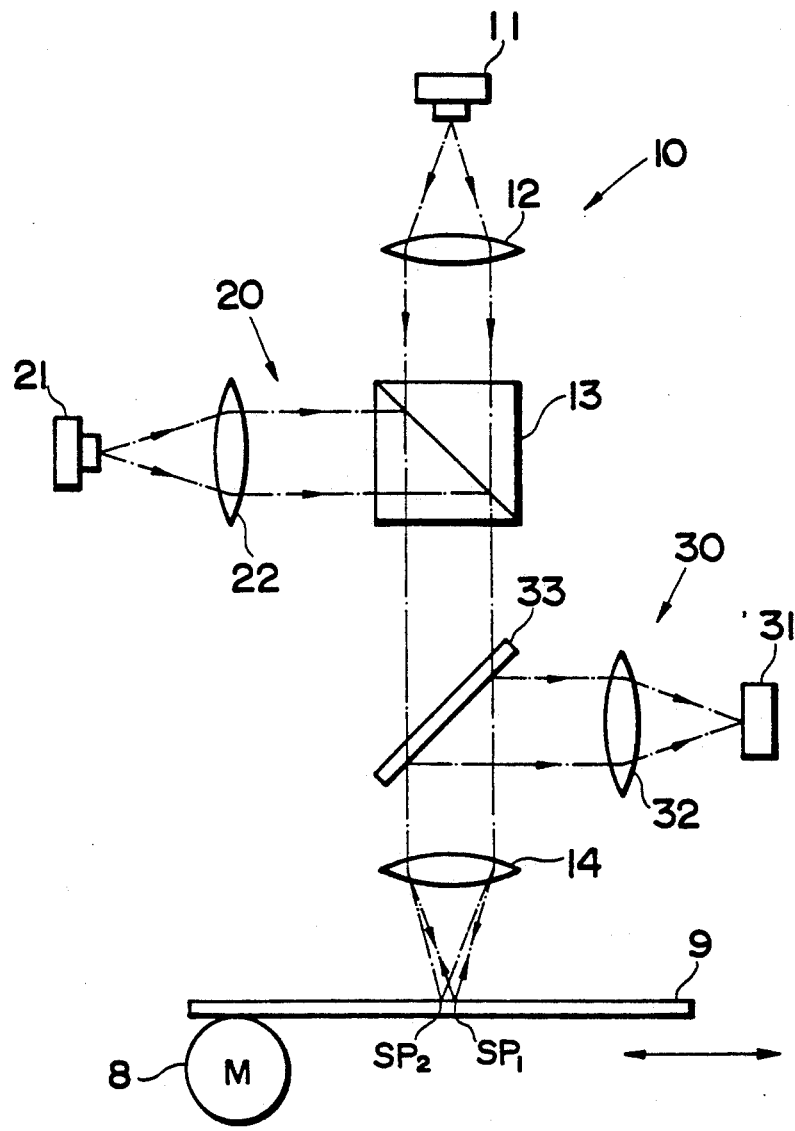
FIG. 2 is a diagram showing the construction of an optical system in an optical recording and reproducing apparatus according to an embodiment of the present invention.

FIG. 2 is a diagram showing the construction of a recording and reproducing optical system in an optical recording and reproducing apparatus according to an embodiment of the present invention. An optical card 9 is illustrated as an example of an optical recording medium.

The optical card 9 is conveyed back and forth in its longitudinal direction (the direction of its track) by a card conveying mechanism (not shown) having a motor 8 as a driving source. In the process of conveying the optical card 9, information (data) is recorded on the optical card 9 or information (data) recorded in pit form on the optical card 9 is read.

The recording and reproducing optical system comprises a recording light projection optical system 10 for projecting a recording light spot SP1 on the track of the optical card 9, a reproducing light projection optical system 20 for projecting a reproducing light spot $SP_2$ on the track of the optical card 9, and a reproducing light reception optical system 30 for receiving reflected light of the reproducing light spot $SP_2$ from the optical card 9 to reproduce data represented by pits formed on the track of the optical card 9.

The recording light projection optical system 10 uses a semiconductor laser 11 as a light source. Light emitted from this semiconductor laser 11 is formed into parallel light by a collimating lens 12. This parallel light is passed through a beam splitter 13 and a half mirror 33 and is focused on the track of the optical card 9 by an objective lens 14, to form a recording light spot $SP_1$ having a diameter of approximately 1 μm. This recording light spot $SP_1$ is projected on the track of the optical card 9. Accordingly, a thermally irreversible change of the optical card 9 occurs in the position where the light spot $SP_1$ is projected, thereby forming pits. The semiconductor laser 11 is driven by pulse signal.

The index of reflection of a portion where the pits are formed is lower than that around the portion. Consequently, the presence or absence of pits can be detected, that is, data can be read on the basis of the reflected light from the optical card 9, as described later.

The reproducing light projection optical system 20 uses a light emitting diode 21 as a light source. Light emitted from this light emitting diode 21 is formed into parallel light by a collimating lens 22. This parallel light is reflected by the beam splitter 13 and passed through the half mirror 33 and is focused on the track of the optical card 9 by the objective lens 14, to from a reproducing light spot $SP_2$ having a diameter of several to several tens μm. This reproducing light spot $SP_2$ is formed in a position slightly behind the recording light spot $SP_1$ in the direction of conveyance of the optical card 9 in the recording mode. Consequently, data can be reproduced using the reproducing light spot $SP_2$ immediately after it was recorded using the recording light spot $SP_1$, to check the recording.

The reproducing light reception optical system 30 is adapted to reflect the reflected light of the reproducing light spot $SP_2$ from the optical card 9 by the half mirror 33 through the objective lens 14, converge the light by a converging lens 32, and receive the light by a photodiode 31. The presence or absence of pits and the contents of data corresponding to the pits can be judged on the basis of such a light reception signal.

Figure 3:
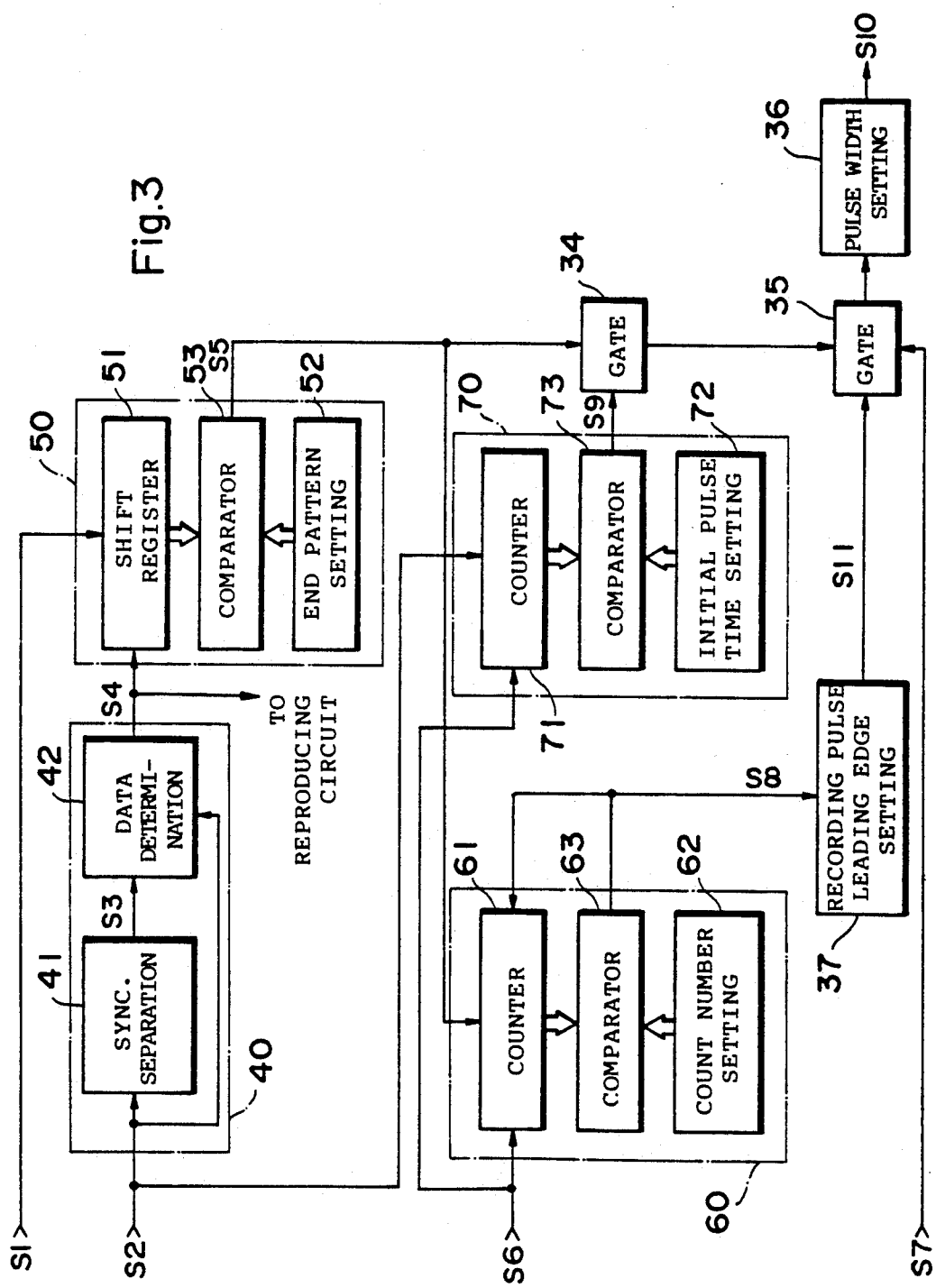
FIG. 3 is a block diagram showing an internal circuit in the optical recording and reproducing apparatus shown in FIG. 2.
Figure 4:
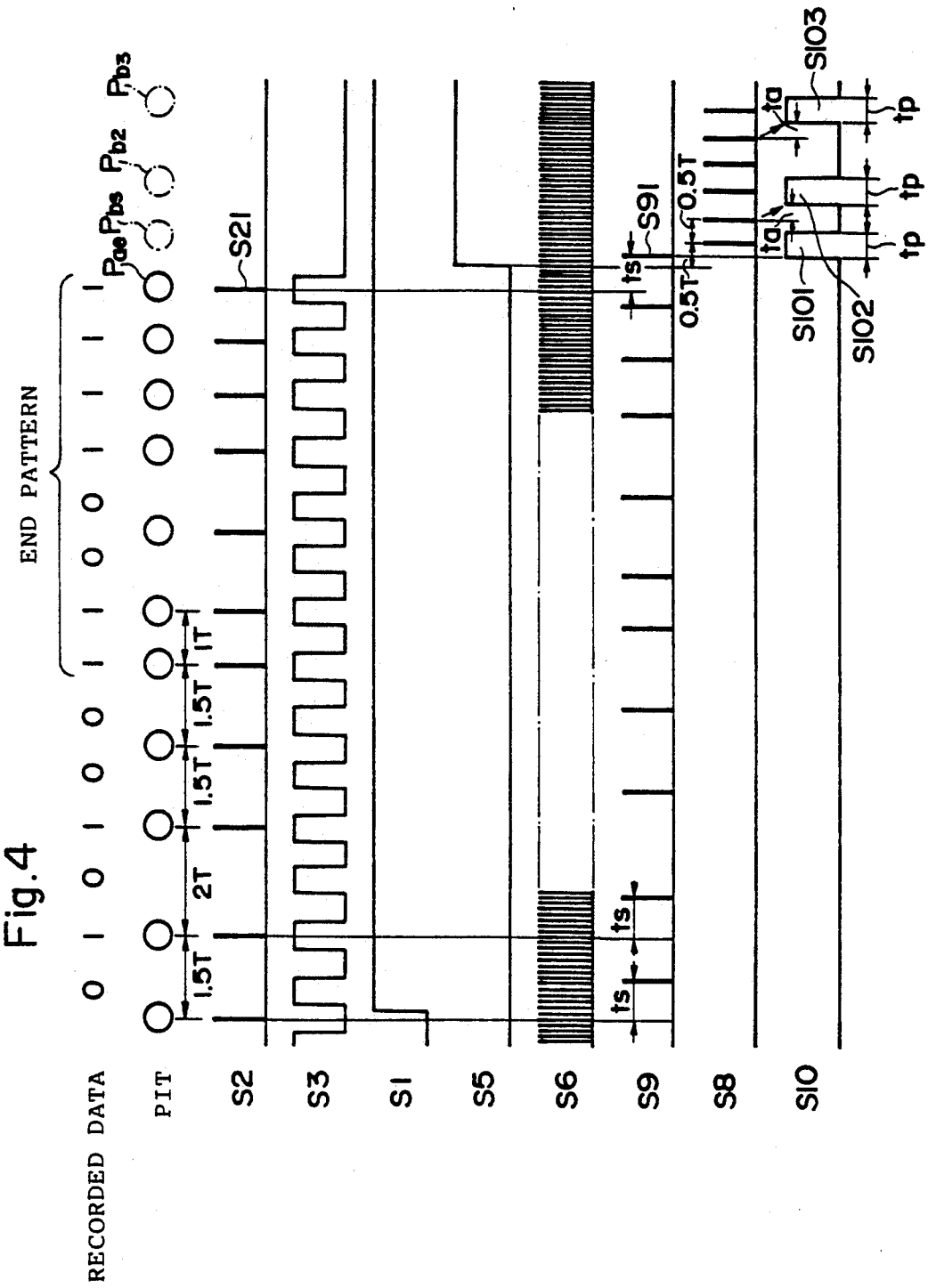
FIG. 4 is a timing chart for explaining an operation of the optical recording and reproducing apparatus shown in FIG. 2.

FIG. 3 is a circuit diagram illustrating a recording circuit (a part thereof is also served as a reproducing circuit) provided in the optical recording and reproducing apparatus according to the embodiment of the present invention, and FIG. 4 is a timing chart for explaining an operation of the circuit.

This recording circuit will be described with reference to FIGS. 3 and 4. For simplicity, FIGS. 3 and 4 do not illustrate means for outputting data to be recorded in pit form onto a track of an optical card, means for outputting a detection command signal of an end pattern of a sector, and means for outputting high-frequency clock pulses in operation.

A circle represented by a solid line in FIG. 4 indicates a pit already recorded on the optical card in the MFM modulation method, for example, a pit in a sector A. On the other hand, a circle represented by a chain line indicates a pit to be recorded in a sector B subsequent to the sector A. MFM modulation is abbreviated from "modified frequency modulation". In this recording circuit, the intervals between pits are of three types; 1 T, 1.5 T and 2 T, where T denotes a predetermined unit length. Data 1 or 0 is represented by the three types of pit intervals.

Consider a case where an end pattern of the sector A of the optical card is detected and subsequently, data is recorded in the sector B.

Figure 5:
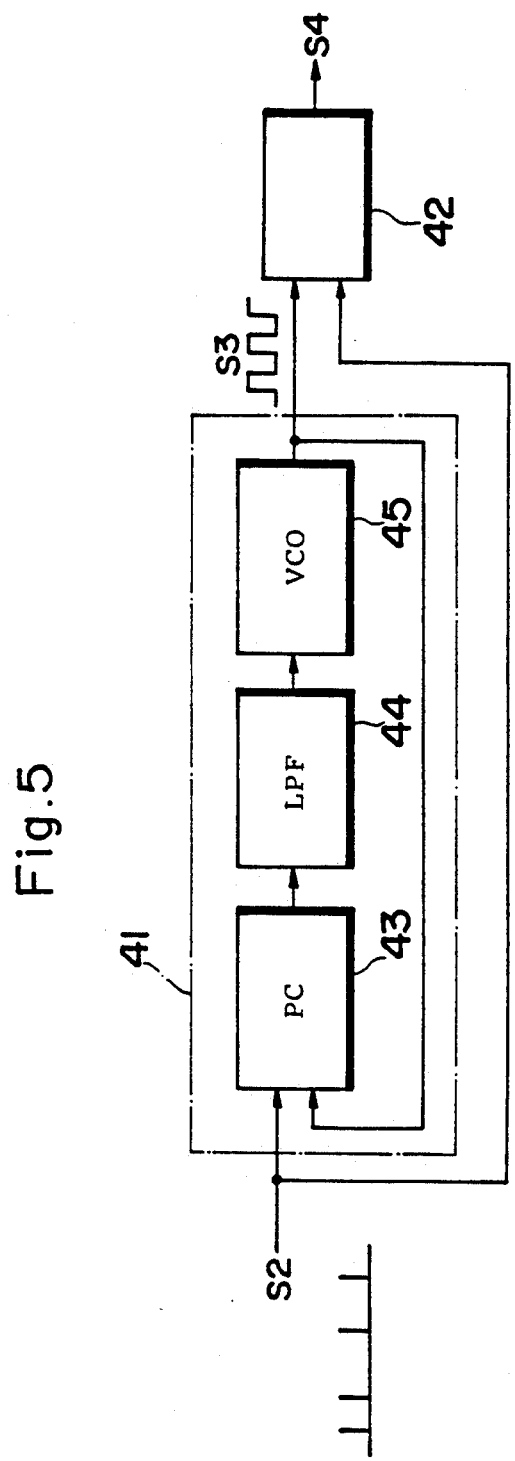
FIG. 5 is a block diagram showing an example of a synchronizing signal separating circuit in the optical recording and reproducing apparatus shown in FIG. 2.

Pits in the sector A are scanned by the reproducing light reception optical system 30. An output signal of the photodiode 31 is subjected to waveform shaping, to be applied to a data demodulating circuit 40 as a pit detection signal S2. Consequently, a synchronizing signal S3 is outputted from a synchronizing signal separating circuit 41 in the data demodulating circuit 40. The synchronizing signal separating circuit 41 is constituted by a PLL (phase-locked loop) comprising a phase comparing circuit 43, a low-pass filter 44 and a voltage controlled oscillator 45, as shown in FIG. 5. The synchronizing signal S3 is applied to a data determining circuit 42 in the data demodulating circuit 40. When the synchronizing signal S3 is at a high level, this data determining circuit 42 determines that data is "1" if the pit detection signal S2 is inputted, while determining that data is "0" if the pit detection signal S2 is not inputted, and outputs the results of the determination to an end pattern detecting circuit 50 as a data signal S4. When an end pattern detection command signal S1 rises to a high level, the data signal S4 is serially inputted to a shift register 51 in the end pattern detecting circuit 50.

This end pattern detecting circuit 50 comprises an end pattern setting circuit 52 in which an end pattern (in the present embodiment, data "11001111") is previously set, and a comparing circuit 53 for comparing an end pattern (an end pattern to be compared) included in the data signal S4 inputted to the shift register 51 with the end pattern (the set end pattern) set in the end pattern setting circuit 52 to output an end pattern detection signal S5 if both the end patterns coincide with each other.

A reference clock signal generating circuit 60 is used for outputting reference clock pulses S8 having a period corresponding to a writing reference interval 0.5 T for recording data in pit form by MFM modulation in synchronization with a pit already recorded (recorded pit). This reference clock signal generating circuit 60 comprises a counter 61 responsive to the input of the end pattern detection signal S5 for starting a counting operation to count high-frequency clock pulses S6 applied thereto, a predetermined count number setting circuit 62 in which a predetermined count number is previously set, and a comparing circuit 63 for comparing a count number (real count number) in the counter 61 with the predetermined count number in the predetermined count number setting circuit 62 to output a reference clock pulse S8 when both the count numbers coincide with each other. The above described predetermined count number is set such that the reference clock pulses S8 are outputted every time the optical card is sent at reference intervals of 0.5 T according to the feed speed of the optical card. The counter 61 is adapted to be reset by the application of the reference clock pulses S8 to start a counting operation from zero again.

The reference clock pulses S8 are applied to a recording pulse leading edge setting circuit 37. This recording pulse leading edge setting circuit 37 is used for determining the time point (timing) of the leading edges of the recording pulses S10 (the second recording pulse S102 and the subsequent pulses in FIG. 4) for driving a semiconductor laser so as to write pits. More specifically, this recording pulse S10 rises after a delay of a predetermined time ta from the corresponding reference clock pulse S8. This delay time ta is set in the recording pulse leading edge setting circuit 37. This circuit 37 outputs pulse signals S11 after the delay time ta from the reference clock pulses S8 in response to the input of the pulses S8.

An initial pulse leading edge timing generating circuit 70 generates an initial pulse leading edge signal S91 for determining the timing of the leading edge of an initial recording pulse S101 for additionally recording, that is, a recording pulse S101 used for recording a pit $P_{bs}$ in the sector B to be positioned subsequently to the last pit $P_{ae}$ in the end pattern of the sector A. Therefore, this generating circuit 70 comprises a counter 71 which is reset in response to the pit detection signal S2 and thus, starts counting of the high-frequency clock pulses S6, an initial pulse time setting circuit 72 in which a count number corresponding to a time ts from the input of the pit detection signal S2 to the leading edge of the initial pulse is previously set, and a comparing circuit 73 for comparing a count number in the counter 71 with the count number set in the initial pulse time setting circuit 72 and outputting an initial pulse leading edge signal S9 when both the count numbers coincide with each other.

When the end pattern detection signal S5 is outputted from the end pattern detecting circuit 50, a gate circuit 34 is enabled. Consequently, the initial pulse leading edge signal S91 generated on the basis of a signal S21, which corresponds to the last pit $P_{ae}$, in the pit detection signal S2 is applied to a pulse width setting circuit 36 through gate circuits 34 and 35. The pulse width setting circuit 36 is used for specifying a pulse width tp of the recording pulses S10. In addition, the gate circuit 35 is controlled by a signal S7 representing data to be recorded. Thus, the initial recording pulse S101 to be applied to the semiconductor laser 11 is outputted from the pulse width setting circuit 36 so as to form the first pit $P_{bs}$ to be recorded in the sector B.

With regard to the second and subsequent pits $P_{b2}$, $P_{b3}$ and the like, the pulse signal S11 outputted from the recording pulse leading edge setting circuit 37 is fed to the pulse width setting circuit 36 through the gate circuit 35 controlled by the signal S7 representing data to be recorded. Accordingly, the recording pulses S102 and S103 to be applied to the semiconductor laser 11 are outputted from the pulse width setting circuit 36 so as to form the pits $P_{b2}$, $P_{b3}$ and the like.

FIGS. 6 and 7 show a modified example. In FIGS. 6 and 7, the same reference numerals are assigned to the same portions as those shown in FIGS. 3 and 4 and hence, the description thereof is not repeated. Description is now made of the modified example with emphasis on different construction from that in the embodiment shown in FIGS. 3 and 4.

In the embodiment shown in FIGS. 3 and 4, the pit detection signal S2 is applied to the counter 71 in the initial pulse leading edge timing generating circuit 70 as a counting start signal. On the other hand, in this modified example, a synchronizing signal S3 outputted from a synchronizing signal separating circuit 41 in a data demodulating circuit 40 is applied to a counter 71 as a counting start signal. As obvious from FIG. 7, the counter 71 starts counting of high-frequency clock pulses S6 at the trailing edge of the synchronizing signal S3. A set time tu set in an initial pulse time setting circuit 72 naturally differs from the time ts in the above described embodiment.

According to a recording circuit in this modified example, even in a case where pits are not correctly reproduced due to flaws and defects on a track of an optical card and thus, the pit detection signal S2 is not applied to the data demodulating circuit 40, a PLL constituting the synchronizing signal separating circuit 41 in the data demodulating circuit 40 outputs the synchronizing signal S3 with the cycle of the previous synchronizing signal S3 being held without any modification even if there are approximately one to two or few pits missing in the pit detection signal S2. Consequently, an initial pulse S91 can be correctly generated and the first pit $P_{bs}$ in the next sector B can be additionally recorded in a right position by controlling the start of counting of the counter 71 in an initial pulse leading edge timing generating circuit 70 on the basis of the synchronizing signal S3.

The data demodulating circuit 40 in the recording circuit according to the embodiment shown in FIG. 3 or 6 will be described in more detail. This data demodulating circuit 40 is also served as a reproducing circuit and is used for demodulating data comprising a combination of "1" and "0" recorded on the track of the optical card in pit form using MFM modulation on the basis of the pit detection signal S2 inputted thereto. The synchronizing signal separating circuit 41 in this data demodulating circuit 40 is constituted by the PLL as shown in FIG. 5, as described above.

In scanning for recording in one sector shown in FIG. 8a, if there is a fluctuation (deviation $\Delta v$) in feed speed of the optical card relative to a reference speed v, as shown in FIG. 8b, due to the effect of nonuniformity in rotation of a motor 8 used for feeding the optical card, the position of a pit to be recorded is shifted or deviated by $\Delta v \cdot 2t$ (with respect to data represented by an interval between two pits of 1 T) from its regular position, as shown in FIG. 8c, according to the fluctuation in feed speed. As a result, fluctuations in time corresponding to the change in speed occur in the pit detection signal S2 applied to the data demodulating circuit 40 when the pit thus shifted in position is detected. Let the period of reference clock pulses S8 be t (=0.5 T). If the deviation in speed is $\Delta v$ with respect to data represented by an interval between pits of 1 T (=2t), the interval between pits is shifted by $\Delta v \cdot 2 t$ from its regular interval.

The frequency of such fluctuations in time of the pit detection signal S2 is generally low, for example, approximately several 10 Hz. Accordingly, the PLL can considerably follow the frequency. Consequently, data in the above sector can be accurately reproduced without providing asynchronization of the synchronizing signal S3 from the pit detection signal S2. In addition, even if there are one to two pits missing in the pit detection signal S2 due to flaws, dust and defects on the track of the recording medium, data can be also reproduced without interfering with a following operation of the PLL.

However, the following capability of the PLL has limits in two respects, that is, the frequency of the fluctuations and the amplitude thereof. The synchronizing signal S3 is asynchronous with the pit detection signal s2 if the limits are exceeded. The asynchronization makes it impossible to determine data in a data determining circuit 42. As a result, data is erroneously read. That is, data cannot be correctly reproduced.

An example in which it becomes impossible to reproduce data will be described with reference to FIG. 9. In the upper row of FIG. 9, a sector A in which pits have been already recorded and a sector B in which new pits are to be additionally recorded subsequently to the pits in this sector A are shown. In general, pits are not recorded in a plurality of sectors in a single track, such as the sectors A and B, in one reciprocating operation of the optical card. When pits are recorded in the sector A, it is assumed that the position of the pits recorded in the sector A are shifted from their regular positions due to the nonuniformity in rotation of the motor, as represented by P in the lower row of FIG. 9. In this state, when pits are to be additionally recorded in the sector B, it is assumed that the shift in position as represented by $P_1$ or $P_2$ occurs in the pits to be recorded in the sector B due to the nonuniformity in rotation of the motor. The shift in position $P_1$ occurs when the average feed speed of the optical card at the time of recording the pits in the sector B is approximately the same as that at the time of recording the pits in the sector A, while the shift in position $p_2$ occurs when the average feed speed at the time of recording the pits in the sector B is lower than that at the time of recording the pits in the sector A. Such a shift in position $P_1$ or $P_2$ of the pits recorded in the sector B does not coincide in phase with the shift in position of the pits recorded in the sector A. Consequently, the amounts of the shift in position of the pits are rapidly changed in the boundary between the sectors A and B.

When the pits in both the sectors A and B in such a recorded state are continuously reproduced by the data demodulating circuit 40 in the reproduction mode, the PLL in the data demodulating circuit 40 cannot follow a rapid change in the amounts of the shift in position of the pits in the boundary between the sectors A and B. Accordingly, data is erroneously read.

Figure 10:
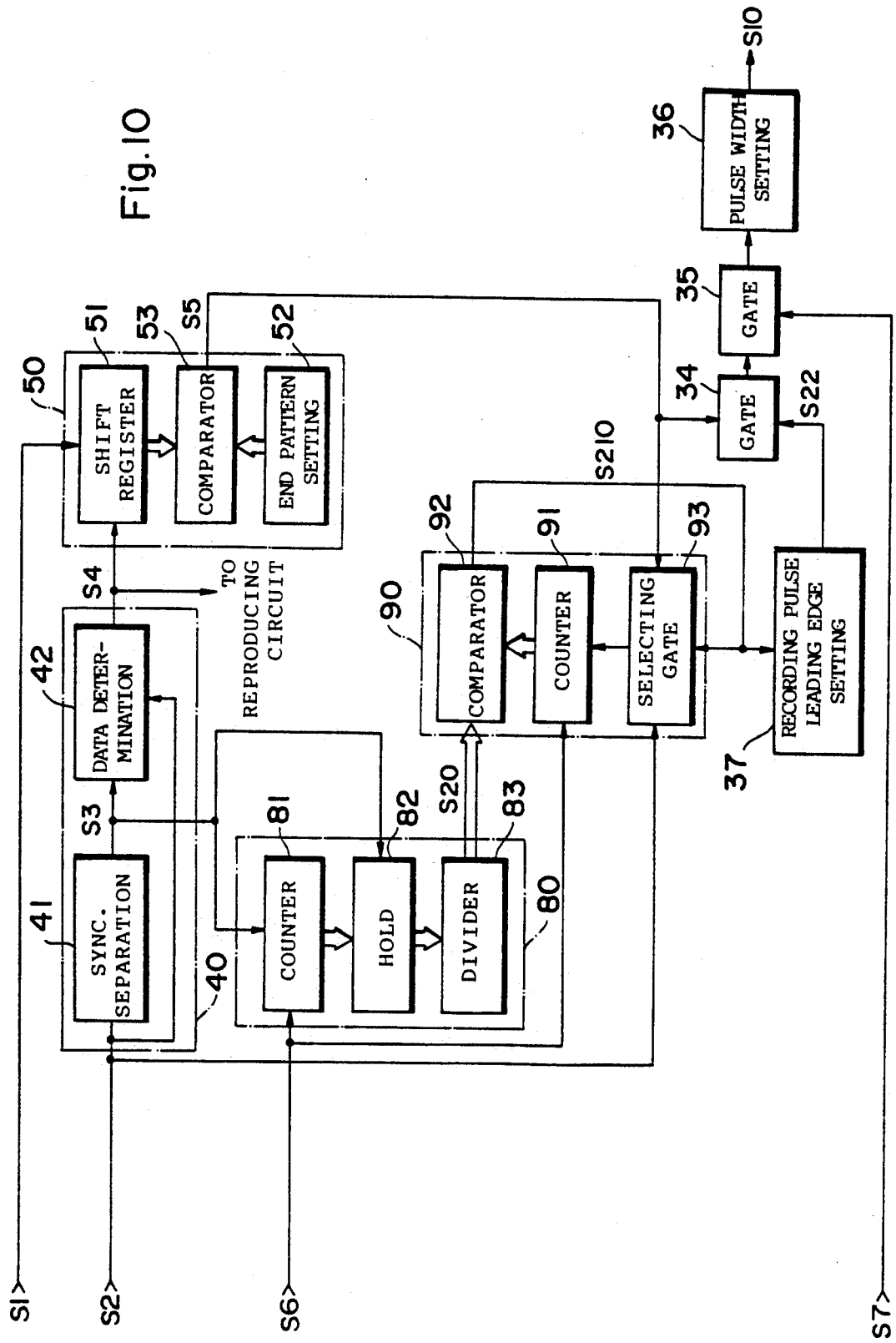
FIG. 10 is a block diagram showing an internal circuit in an optical recording and reproducing apparatus according to another embodiment of the present invention.
Figure 11:
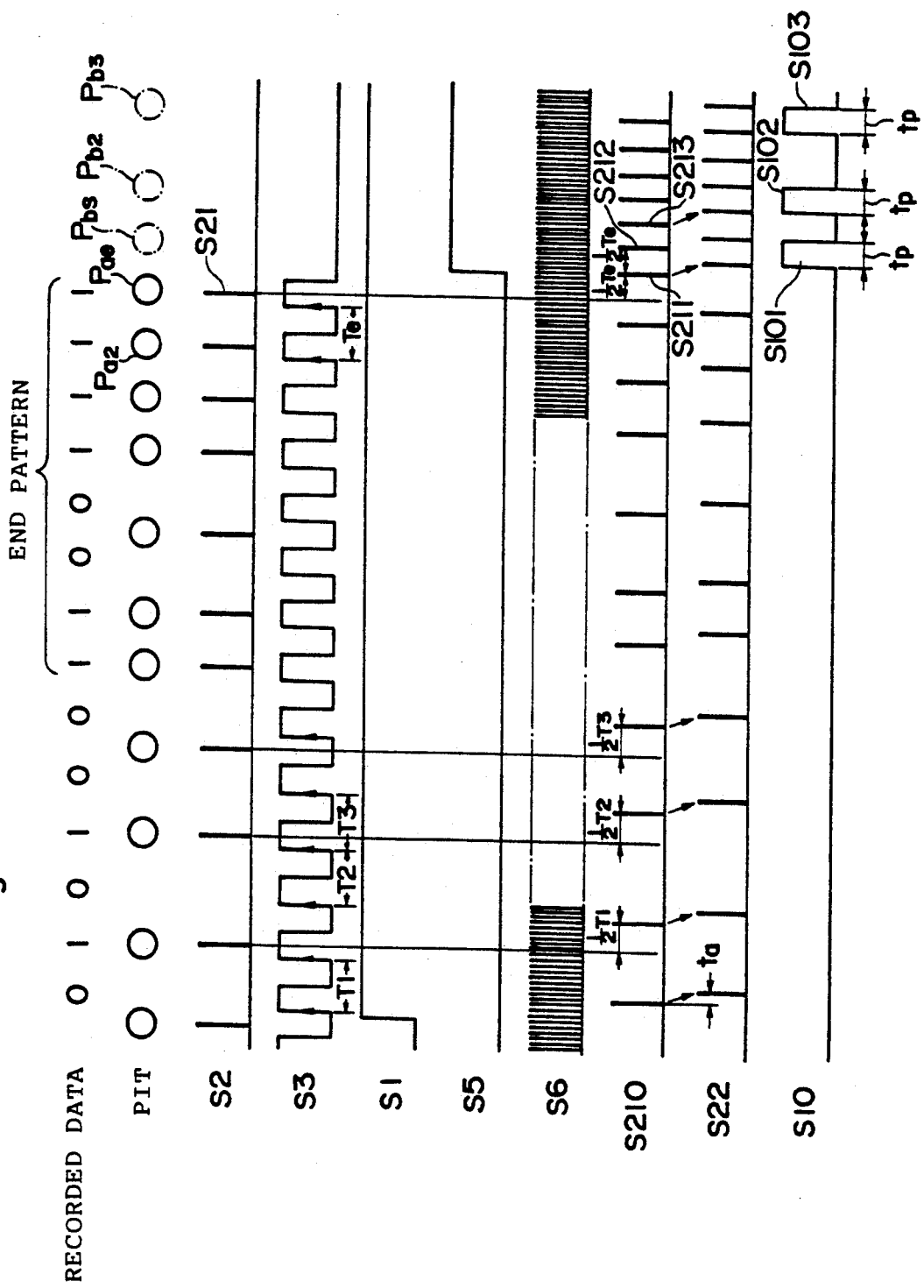
FIG. 11 is a timing chart for explaining an operation of the optical recording and reproducing apparatus shown in FIG. 10.

An embodiment of an optical recording and reproducing apparatus capable of preventing the occurrence of the above described problems will be described with reference to FIGS. 10 and 11. In FIGS. 10 and 11, the same reference numerals are assigned to the portions already described and hence, the description thereof is not repeated.

Description is now made of the embodiment shown in FIG. 10 with emphasis on different construction from that in the embodiment shown in FIG. 3.

A recording circuit according to the present embodiment comprises a time width generating circuit 80 and a recording timing signal generating circuit 90 in place of the reference clock generating circuit 60 and the initial pulse leading edge timing generating circuit 70 in the embodiment shown in FIG. 3.

This time width generating circuit 80 is responsive to a synchronizing signal S3 from a synchronizing signal separating circuit 41 in a data demodulating circuit 40 for generating a time width signal S20 representing the time width which is one-half of the period of the synchronizing signal S3 and comprises a counter 81, which is reset on the leading edge of the synchronizing signal S3 to start counting, for counting high-frequency clock pulses S6 inputted in the time period elapsed until it is reset again on the leading edge of the next synchronizing signal S3 to measure the cycle T1, T2, T3, , Te of each of the synchronizing signals S3. The time width generating circuit further includes a number holding circuit 82 for latching a count number in the counter 81 on the leading edge of the synchronizing signal S3 to hold the same. The circuit 82 is adapted to update the contents held on the leading edge of the next synchronizing signal S3. A divider 83 decreases the count number held in the count number holding circuit 82 by one-half to output the same as a time width signal S20.

The recording timing signal generating circuit 90 comprises a comparing circuit 92 for comparing the time width signal S20 from the divider 83 with a count number signal from a counter 91 as described below to output a recording timing signal 210 when both the signals coincide with each other, a counter 91 for counting the high-frequency clock pulses S6 to output a count number signal to the comparing circuit 92, and a selecting gate 93 for applying a pit detection signal S2 to the counter 91 as a first reset signal and applying the recording timing signal S210 of the comparing circuit 92 to the counter 91 as a second reset signal after an end pattern detection signal S5 is applied from an end pattern detecting circuit 50.

Description is now made of an operation of main portions of a recording circuit according to the present embodiment. The synchronizing signal S3 is inputted to the counter 81 in the time width setting circuit 80 from the synchronizing signal separating circuit 41 in the data demodulating circuit 40 in response to the input of the pit detection signal S2. The counter 81 is reset on the leading edge of this synchronizing signal S3 to start a counting operation, and counts the high-frequency clock pulses S6 inputted in the time period elapsed until the next synchronizing signal S3 rises. A count number in the counter 81 during one cycle of the synchronizing signal S3 (corresponding to the period T1, T2, . . . , Te between the synchronizing signals S3) is held in the count number holding circuit 82. The count number held in the count number holding circuit 82 is decreased by one-half in the divider 83, to be a time width signal S20. The time width signal S20 from this divider 83 is applied to the comparing circuit 92 in the recording timing signal generating circuit 92.

In the recording timing signal generating circuit 90, the counter 91 is reset in response to the pit detection signal S2 applied from the selecting gate 93. This counter 91 starts counting the high-frequency clock pulses S6 when it is reset. When a count number in the counter 91 corresponds to the time width signal S20, the recording timing signal S210 is outputted from the comparing circuit 92. Consequently, the timing of outputting the recording timing signal S210 is delayed in time from the timing of generating the pit detection signal S2 by one-half of the period T1, T2, . . . , Te of the synchronizing signal S3, that is, T1/2, T2/2, . . . , Te/2. This recording timing signal S210 is applied to a recording pulse leading edge setting circuit 37. Therefore, a recording pulse leading edge signal S22 is outputted from the recording pulse leading edge setting circuit 37 after a delay time ta of the setting circuit 37 has elapsed since the recording timing signal S210 was outputted. It is signals outputted after the last pit $P_{ae}$ in an end pattern is detected (after the end pattern detection signal S5 attains a high level) that are applied to a pulse width setting circuit 36 through gate circuits 34 and 35 out of recording pulse leading edge signals S22. Accordingly, recording pulses S10 (S101, S102, S103 and the like) are outputted from the pulse width setting circuit 36 after the end pattern is detected, as shown in FIG. 11.

Figure 12:
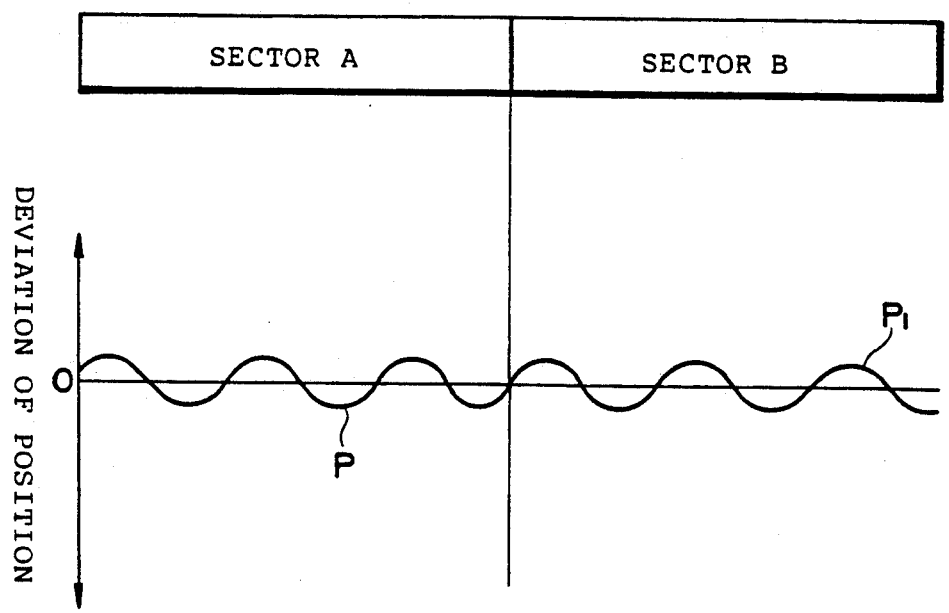
FIG. 12 is a diagram showing a state where the amounts of the shift in position of pits are continuously changed in the boundary between two sectors in the optical recording and reproducing apparatus shown in FIG. 10.

More specifically, in the recording circuit according to the present embodiment, the timing of outputting the recording pulse S101 for recording the first pit $P_{bs}$ in a sector subsequent to the last pit $P_{ae}$ in the end pattern is specified by the recording timing signal S210 (signal S211) generated at the time point where the time of Te/2 has elapsed from the time point where the last pit $P_{ae}$ was detected (the time point where the pit detection signal S21 was generated). The period Te used herein is a period between the synchronizing signal S3 corresponding to the detection of the last pit $P_{ae}$ and the synchronizing signal S3 corresponding to the detection of the preceding pit $P_{a2}$. More specifically, the pit $P_{bs}$ to be first additionally recorded in the sector B will be recorded on the optical card by reflecting the amount of the shift in position between the last pit $P_{ae}$ and the preceding pit $P_{a2}$ constituting the end pattern. As a result, the amounts of the shift in position of pits are continuous between the sectors A and B, as represented by, for example, P and $P_1$ in FIG. 12. At the time of reproduction, data in the sectors A and B can be accurately reproduced in the data demodulating circuit 40.

Recording timing signals S212, S213, ... outputted are generated at intervals of Te/2, after the recording timing signal S211 is outputted when the time of Te/2 has elapsed since the last pit $P_{ae}$ was detected, because the end pattern detection signal S5 has been already applied to the selecting gate 93 and thus, the counter 91 is reset in response to the recording timing signal S210.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical recording and reproducing apparatus for reproducing data recorded on a preceding sector and for recording data on a succeeding sector immediately subsequent to said preceding sector, said preceding sector and succeeding sector being included in a track of a recording medium having a plurality of tracks, comprising:

a reproducing optical system, having a first light emitting element and a light receiving element, for projecting light emitted from said first light emitting element onto said preceding sector on which a plurality of pits representing data are formed and for receiving light reflected from said preceding sector by said light receiving element to produce a pit detection signal based on said received light;

a recording light projection optical system, having a second light emitting element, for projecting light emitted from said second light emitting element to form a pit on said succeeding sector;

data demodulating means for generating a synchronizing signal on the basis of said pit detection signal generated by said reproducing optical system;

time width signal generating means for generating a time width signal representing one-half of a period of said synchronizing signal applied from said data demodulating means;

end pattern detecting means for outputting an end pattern detection signal when an end pattern of said preceding sector is detected in said pit detection signal, data representing said end pattern being previously recorded on an end portion of said preceding sector;

recording timing signal generating means receiving said time width signal and said pit detection signal for generating and outputting a pit recording timing signal when a time represented by said time width signal has elapsed from a time point when said pit detection signal is received;

recording pulse leading edge signal setting and generating means receiving said pit recording timing signal, in which a predetermined delay time is previously set, for generating a recording pulse leading edge signal after said delay time from said pit recording timing signal;

gate means responsive to said end pattern detection signal outputted from said end pattern detecting means for allowing passage of said recording pulse leading edge signal; and means for generating a recording pulse for driving said second light emitting element of said recording light projection optical system on the basis of said recording pulse leading edge signal passed through said gate means and another signal representing data to be recorded on said succeeding sector.

2. The apparatus according to claim 1, wherein said recording timing signal generating means is responsive to said end pattern detection signal for generating and outputting a second recording timing signal having a period which is equal to the time represented by said time width signal.

3. A method for optically reproducing data recorded on a preceding sector and for recording data on a succeeding sector immediately subsequent to said preceding sector, said preceding sector and succeeding sector being included in a track of a recording medium having a plurality of tracks, comprising the steps of:

projecting light emitted from a first light emitting element onto said preceding sector on which a plurality of pits representing data are formed and receiving light reflected from said preceding sector by said light receiving element to produce a pit detection signal based on said received light;

generating a synchronizing signal on the basis of said pit detection signal;

generating a time width signal representing one-half of a period of said synchronizing signal;

detecting an end pattern of said preceding sector in said pit detection signal, data representing said end pattern being previously recorded on an end portion of said preceding sector;

outputting an end pattern detection signal when said end pattern of said preceding sector is detected;

generating a recording timing signal when a time represented by said time width signal has elapsed from a time point when said pit detection signal is produced;

generating a recording pulse leading edge signal after a delay time from said recording timing signal;

allowing passage of said according pulse leading edge signal by a gate means responsive to said end pattern detection signal;

generating a recording pulse for driving a second light emitting element on the basis of said recording pulse leading edge signal passed through said gate means and another signal representing data to be recorded on said succeeding sector; and projecting light emitted from said second light emitting element to form a pit on said succeeding sector.

4. The method according to claim 3, further comprising the step of generating a second recording timing signal in response to said end pattern detection signal, said second recording timing signal having a period which is equal to the time represented by said time width signal.

* * * * *